Patented Oct. 6, 1953

2,654,791

UNITED STATES PATENT OFFICE 2,654,791

PRODUCTION OF 2-CHLORO-1-PHENYL-PROPANE

Arthur W. Weston, Waukegan, Ill., assignor to Abbott Laboratories, North Chicago, Ill., a corporation of Illinois No Drawing. Application November 20, 1948, Serial No. 61,301

5 Claims. (Cl. 260—651)

This invention relates to a new and improved method of producing 2-chloro-1-phenylpropane. The compound 2-chloro-1-phenylpropane is a valuable organic intermediate but its preparation has been found extremely difficult.

Nenitzescu et al., Ber., 66, 1100 (1933) found that 2-chloropropylbenzene (2-chloro-1-phenylpropane) is produced by the reaction of benzene and allyl chloride with zinc or ferric chloride catalyst but only in low yields. They found at temperatures above $-14°$ C. no 2-chloro-1-phenylpropane can be isolated, and that the higher temperatures yield 1,2-diphenylpropane as a product of the reaction. The optimum temperature was $-20°$ C. where a yield of only 28% of 2-chloro-1-phenylpropane was obtained. This reaction was substantiated by Patrick et al., J. Am. Chem. Soc., 68, 1009 (1946), who also obtained the low yields and then only at the lower temperatures of $-20°$ C. or less.

Silva M. R.-D Compt. rend. Acad. S. 89, 606 (1879) describes a method for preparing 1,2-diphenylpropane by the reaction of benzene and allyl chloride in the presence of anhydrous aluminum chloride. Nenitzescu et al., supra, substantiated this reaction, and further found that wet aluminum chloride catalyst for the benzene-allyl chloride reaction produced n-propylbenzene and 9,10-diethylanthracene. See also Gilman, H. J., Org. Chem. 8, 126 (1943). Up to the time of my investigations no one had been able to isolate 2-chloro-1-phenylpropane from a benzene-allyl chloride aluminum chloride catalyzed reaction mixture.

I have now discovered that by employing an organic nitro compound such as nitromethane, nitroethane, nitropropane, nitrobenzene, and like compounds, in conjunction with anhydrous aluminum chloride in the reaction of benzene and allyl chloride, or allyl alcohol, high yields of 2-chloro-1-phenylpropane are obtained. Also by utilizing my invention it is possible to carry out the reactions at about room temperature.

The disadvantages of the prior art processes are obvious to those skilled in the trade. For instance, the difficulties and the problems encountered in adapting the very low temperature reaction of benzene and allyl chloride with zinc or ferric chloride catalyst to a commercial operation are almost insurmountable. Such a commercial process would be very costly indeed, because the reaction is highly exothermic creating a very difficult cooling problem. As pointed out by Nenitzescu et al., a few degrees variation in temperature will decrease the yields greatly, and even a five degree temperature rise above the optimum temperature will decrease the yield to practically nothing.

In carrying out my invention I prefer to use nitropropane as the catalyst conjunctant because of the ease of separation of the nitropropane from the reaction mixture. The temperature of the reaction may be varied from $-5°$ C. to about $+20°$ C., but I have found that the best results are obtained at about $+10°$ C. I also prefer to use an excess of benzene for the reaction medium but other inert solvents may be used, such as carbon disulfide and the like. It is preferable to have the reaction ingredients and equipment in a substantially dry condition since water is detrimental to the reaction.

I also prefer to use allyl chloride as the reactant with benzene, but allyl alcohol will also yield 2-chloro-1-phenylpropane. The yields obtained from the allyl chloride are somewhat higher than with allyl alcohol. However, the reaction of allyl alcohol and benzene is preferably carried out at a reflux temperature, and the necessity of cooling the reaction is overcome. Utilizing this embodiment of my invention, no special equipment is needed, and the problems of reduction to commercial production are greatly decreased.

In more specific detail the following examples illustrate my invention.

Example I

To a cool mixture of about 360 cc. of anhydrous benzene and about 260 cc. of nitropropane is added about 77 grams of anhydrous aluminum chloride slowly and with continuous stirring. A solution of 77 grams of allyl chloride in an equal volume of dry benzene is added slowly to the mixture, and the temperature of the reaction mixture is maintained between $-5°$ C. and $0°$ C. On completing the addition of the allyl chloride solution the stirring is continued for about ½ hour, and the mixture is hydrolyzed in a cold solution of 50 cc. concentrated hydrochloric acid in 500 cc. of water. The benzene layer is separated and the aqueous phase extracted with several equal volumes of additional benzene. The combined benzene phases are dried over a sodium bicarbonate-sodium sulfate mixture. 2-chloro-1-phenylpropane is obtained from the mixture by distillation at 70–74° C. at 3 mm. pressure, in a good yield.

Example II

About 67 grams of anhydrous aluminum chloride are slowly added to a solution of 255 cc. nitropropane, 350 cc. of benzene, and 58 grams of allyl alcohol and the resulting mixture is refluxed until no more hydrogen chloride gas is given off. The reaction mixture is then hydrolyzed in the dilute hydrochloric acid and the 2-chloro-1-phenylpropane is recovered as per Example I. The yield of 2-chloro-1-phenylpropane is good.

*Example III*

Two solutions, one containing 5 pounds of anhydrous aluminum chloride, 5.5 pounds of 1-nitropropane and 8 gallons of benzene, and the other solution containing 5.13 pounds of allyl chloride and 9 gallons of benzene are equally proportioned into a mixing chamber and then expelled through a copper reaction coil into a cold dilute hydrochloric acid solution. The mixing chamber which is a small baffled tank leads to a quarter inch copper coil about 12 feet long and both the mixing chamber and the coil are immersed into a cold brine solution. The flow of the reactants through the coil is adjusted so that the temperature of the reactants is between 0° C. and room temperature. The benzene phase is separated from the dilute acid and the 2-chloro-phenylpropane is recovered as per Example I in a very good yield.

In this continuous reaction the time-temperature relation of the reaction is an important consideration. For instance, at the higher temperature the time of reaction must be shorter, and the time is decreased by increasing the rate of flow through the reaction coil. The size of the coil is, obviously, regulated by the time of reaction and rate of flow.

It is possible to vary the amounts of solvent used in the reaction, but it is obvious that the two reactant mixtures should be proportioned so that they are in the proper ratio of catalyst to reactants.

The reaction of allyl chloride and benzene yields other products than 2-chloro-1-phenylpropane, but some of them are not fully evaluated. For instance, there is formed diphenylpropane, and probably the isomers allylbenzene and propenylbenzene in addition to 2-chloro-1-phenylpropane.

By replacing the nitropropane with nitromethane, nitroethane or nitrobenzene in the above examples, the reaction proceeds in the same manner. We prefer however, to use nitropropane because of the ease of recovery from the reaction mixture.

Others may readily adapt the invention for use under various conditions of service, by employing one or more of the novel features disclosed, or equivalents thereof. As at present advised with respect to the apparent scope of my invention, I desire to claim the following subject matter.

I claim:

1. The process of producing 2-chloro-1-phenylpropane which comprises reacting benzene and allyl chloride in the presence of anhydrous aluminum chloride and a nitro hydrocarbon selected from the group consisting of nitromethane, nitroethane, nitropropane and nitrobenzene, at a temperature of about 0° C. to about +20° C., and recovering 2-chloro-1-phenylpropane from the reaction mixture.

2. The process of producing 2-chloro-1-phenylpropane which comprises reacting benzene and allyl chloride in the presence of anhydrous aluminum chloride and nitropropane at a temperature of about 0° C. to room temperature, adding aqueous hydrochloric acid, and distilling the water immiscible phase of the reaction mixture to recover 2-chloro-1-phenylpropane.

3. The process of producing 2-chloro-1-phenylpropane which comprises reacting benzene and allyl chloride in the presence of anhydrous aluminum chloride and nitromethane at a temperature of about 0° C. to room temperature, and recovering 2-chloro-1-phenylpropane from the reaction mixture.

4. The process of producing 2-chloro-1-phenylpropane which comprises reacting benzene and allyl chloride in the presence of anhydrous aluminum chloride and nitroethane at a temperature of about 0° C. to room temperature, and recovering 2-chloro-1-phenylpropane from the reaction mixture.

5. The process of producing 2-chloro-1-phenylpropane which comprises reacting benzene and allyl chloride in the presence of anhydrous aluminum chloride and nitrobenzene at a temperature of about 0° C. to room temperature, and recovering 2-chloro-1-phenylpropane from the reaction mixture.

ARTHUR W. WESTON.

References Cited in the file of this patent

UNITED STATES PATENTS

| Number | Name | Date |
|---|---|---|
| 2,076,201 | Langedijk | Apr. 6, 1937 |

OTHER REFERENCES

Nenitzescu et al.: "Ber. der deut. Chem. Gesell.," vol. 66, pages 1100–1103 (1933).

Thomas: "Anhydrous Aluminum Chloride in Organic Chemistry," pages 783–4 (1941).